United States Patent
Smith et al.

(10) Patent No.: US 7,355,990 B2
(45) Date of Patent: *Apr. 8, 2008

(54) MOBILE-ORIGINATED TO HTTP INTERNET COMMUNICATIONS

(75) Inventors: Richard A. Smith, Annapolis, MD (US); Johanna Wilson, Annapolis, MD (US)

(73) Assignee: TeleCommunication Systems, Inc., Annapolis, MD (US)

(*) Notice: Subject to any disclaimer, the term of this patent is extended or adjusted under 35 U.S.C. 154(b) by 74 days.

This patent is subject to a terminal disclaimer.

(21) Appl. No.: 11/113,033

(22) Filed: Apr. 25, 2005

(65) Prior Publication Data

US 2006/0242230 A1    Oct. 26, 2006

(51) Int. Cl.
H04B 7/00    (2006.01)
(52) U.S. Cl. ..................................... 370/310
(58) Field of Classification Search ............... 455/466; 370/310
See application file for complete search history.

(56) References Cited

U.S. PATENT DOCUMENTS

| | | | |
|---|---|---|---|
| 1,103,073 A | 7/1914 | O'Connel |
| 4,494,119 A | 1/1985 | Wimbush |
| 4,651,156 A | 3/1987 | Martinez |
| 4,706,275 A | 11/1987 | Kamil |
| 4,891,638 A | 1/1990 | Davis |
| 4,891,650 A | 1/1990 | Sheffer |
| 4,952,928 A | 8/1990 | Carroll et al. |
| 5,014,206 A | 5/1991 | Scribner et al. |
| 5,043,736 A | 8/1991 | Darnell et al. |
| 5,043,739 A | 8/1991 | Darnell et al. |
| 5,055,851 A | 10/1991 | Sheffer |
| 5,068,656 A | 11/1991 | Sutherland |
| 5,068,891 A | 11/1991 | Marshall |
| 5,070,329 A | 12/1991 | Jasinami |
| 5,081,667 A | 1/1992 | Drori et al. |
| 5,119,104 A | 6/1992 | Heller |
| 5,144,283 A | 9/1992 | Arenas et al. |
| 5,161,180 A | 11/1992 | Chavous |
| 5,177,478 A | 1/1993 | Wagai et al. |
| 5,193,215 A | 3/1993 | Olmer |
| 5,208,756 A | 5/1993 | Song |
| 5,214,789 A | 5/1993 | George |
| 5,218,367 A | 6/1993 | Sheffer |
| 5,223,844 A | 6/1993 | Mansell et al. |

(Continued)

Primary Examiner—Lester G. Kincaid
Assistant Examiner—Diego Herrera
(74) Attorney, Agent, or Firm—William H. Bollman

(57) ABSTRACT

A mobile device-to-HTTP protocol gateway (MHG, or "MO Gateway") which translates between Wireless Mobile Originated commands from an SMSC, and an application server on the Internet (i.e., a "web IP Server"). A wireless Internet gateway establishes communications with one or more relevant SMSCs using standard format SMPP commands, and the MHG utilizes HTTP protocol POST messages to post short messages originated at the mobile device to a particular URL. Return results are received by the MHG via HTTP protocol messages, translated to SMPP messages, and forwarded back to the SMSC for delivery to the mobile device. The wireless Internet Gateway communicates with the MHG using RMI protocol commands. An MHG in accordance with the principles of the present invention enables a developer to create mobile applications using standard web development tools, e.g., Java Servlets. The MHG allows standard format command messages to be used throughout the pathway between a mobile device and an application program on a web IP server at a particular URL.

28 Claims, 8 Drawing Sheets

U.S. PATENT DOCUMENTS

| | | |
|---|---|---|
| 5,235,630 A | 8/1993 | Moodey et al. |
| 5,239,570 A | 8/1993 | Koster et al. ............... 709/203 |
| 5,243,645 A | 9/1993 | Bissell et al. |
| 5,266,944 A | 11/1993 | Carrol et al. |
| 5,289,527 A | 2/1994 | Tiedemann, Jr. |
| 5,293,642 A | 3/1994 | Lo |
| 5,299,132 A | 3/1994 | Wortham |
| 5,325,302 A | 6/1994 | Izidon et al. |
| 5,334,974 A | 8/1994 | Simms et al. |
| 5,343,493 A | 8/1994 | Karimullah |
| 5,347,568 A | 9/1994 | Moody et al. |
| 5,351,235 A | 9/1994 | Lahtinen |
| 5,361,212 A | 11/1994 | Class et al. |
| 5,363,425 A | 11/1994 | Mufti et al. |
| 5,374,936 A | 12/1994 | Feng |
| 5,379,451 A | 1/1995 | Nakagoshi et al. |
| 5,381,338 A | 1/1995 | Wysocki et al. |
| 5,387,993 A | 2/1995 | Heller |
| 5,388,147 A | 2/1995 | Grimes |
| 5,390,339 A | 2/1995 | Bruckert et al. |
| 5,394,158 A | 2/1995 | Chia |
| 5,396,227 A | 3/1995 | Carroll et al. |
| 5,398,190 A | 3/1995 | Wortham |
| 5,406,614 A | 4/1995 | Hara |
| 5,418,537 A | 5/1995 | Bird |
| 5,423,076 A | 6/1995 | Westergreen et al. |
| 5,432,841 A | 7/1995 | Rimer |
| 5,434,789 A | 7/1995 | Fraker et al. |
| 5,454,024 A | 9/1995 | Lebowitz |
| 5,461,390 A | 10/1995 | Hoshen |
| 5,470,233 A | 11/1995 | Fuchterman et al. |
| 5,479,482 A | 12/1995 | Grimes |
| 5,485,161 A | 1/1996 | Vaughn |
| 5,485,163 A | 1/1996 | Singere et al. |
| 5,488,563 A | 1/1996 | Chazelle et al. |
| 5,497,149 A | 3/1996 | Fast |
| 5,508,931 A | 4/1996 | Snider |
| 5,513,243 A | 4/1996 | Kage |
| 5,515,287 A | 5/1996 | Hakoyama et al. |
| 5,519,403 A | 5/1996 | Bickley et al. |
| 5,532,690 A | 7/1996 | Hertel |
| 5,535,434 A | 7/1996 | Siddoway et al. |
| 5,539,398 A | 7/1996 | Hall et al. |
| 5,543,776 A | 8/1996 | L'Esperance et al. |
| 5,552,772 A | 9/1996 | Janky et al. |
| 5,555,286 A | 9/1996 | Tendler |
| 5,568,119 A | 10/1996 | Schipper et al. |
| 5,574,648 A | 11/1996 | Pilley |
| 5,579,372 A | 11/1996 | Astrom |
| 5,588,009 A | 12/1996 | Will |
| 5,592,535 A | 1/1997 | Klotz |
| 5,604,486 A | 2/1997 | Lauro et al. |
| 5,606,313 A | 2/1997 | Allen et al. |
| 5,606,850 A | 3/1997 | Nakamura |
| 5,610,815 A | 3/1997 | Gudat et al. |
| 5,614,890 A | 3/1997 | Fox |
| 5,615,116 A | 3/1997 | Gudat et al. |
| 5,621,793 A | 4/1997 | Bednarak et al. |
| 5,628,051 A | 5/1997 | Salin |
| 5,633,912 A | 5/1997 | Tsoi |
| 5,673,306 A | 9/1997 | Amadon et al. |
| 5,682,600 A | 10/1997 | Salin |
| 5,692,037 A | 11/1997 | Friend |
| 5,694,546 A | 12/1997 | Reisman |
| 5,740,534 A | 4/1998 | Ayerst et al. |
| 5,761,618 A | 6/1998 | Lynch et al. |
| 5,767,795 A | 6/1998 | Schaphorst |
| 5,768,509 A | 6/1998 | Gunluk |
| 5,774,533 A | 6/1998 | Patel |
| 5,787,357 A | 7/1998 | Salin |
| 5,794,142 A | 8/1998 | Vanttila et al. |
| 5,797,091 A | 8/1998 | Clise et al. |
| 5,797,094 A | 8/1998 | Houde |
| 5,797,096 A | 8/1998 | Lupien et al. |
| 5,802,492 A | 9/1998 | Delorme et al. |
| 5,806,000 A | 9/1998 | Vo et al. |
| 5,822,700 A | 10/1998 | Hult et al. |
| 5,828,740 A | 10/1998 | Khuc et al. |
| 5,905,736 A | 5/1999 | Rohen et al. |
| 5,920,821 A | 7/1999 | Seaholtz et al. |
| 5,930,701 A | 7/1999 | Skog |
| 5,943,399 A | 8/1999 | Bannister et al. |
| 5,946,629 A | 8/1999 | Sawyer et al. |
| 5,946,630 A | 8/1999 | Willars et al. |
| 5,949,326 A | 9/1999 | Wicks et al. |
| 5,950,130 A | 9/1999 | Coursey |
| 5,953,398 A | 9/1999 | Hill |
| 5,960,074 A | 9/1999 | Clark |
| 5,966,663 A | 10/1999 | Gleason |
| 5,974,054 A | 10/1999 | Couts et al. |
| 5,978,685 A | 11/1999 | Laiho |
| 5,987,323 A | 11/1999 | Huotari |
| 5,999,811 A | 12/1999 | Molne |
| 6,035,025 A | 3/2000 | Hanson |
| 6,049,710 A | 4/2000 | Nilsson |
| 6,058,300 A | 5/2000 | Hanson |
| 6,064,875 A | 5/2000 | Morgan |
| 6,070,067 A | 5/2000 | Nguyen et al. |
| 6,075,982 A | 6/2000 | Donovan et al. |
| 6,078,583 A | 6/2000 | Takahara |
| 6,081,508 A | 6/2000 | West et al. |
| 6,101,378 A | 8/2000 | Barabash et al. |
| 6,122,503 A | 9/2000 | Daly |
| 6,122,520 A | 9/2000 | Want et al. |
| 6,138,158 A | 10/2000 | Boyle et al. ................ 709/219 |
| 6,144,653 A | 11/2000 | Persson et al. |
| 6,148,197 A | 11/2000 | Bridges et al. |
| 6,148,198 A | 11/2000 | Anderson et al. |
| 6,149,353 A | 11/2000 | Nilsson |
| 6,169,891 B1 | 1/2001 | Gorham et al. |
| 6,173,181 B1 | 1/2001 | Losh |
| 6,178,331 B1 | 1/2001 | Holmes et al. |
| 6,181,935 B1 | 1/2001 | Gossman et al. |
| 6,185,602 B1 | 2/2001 | Bayrakeri |
| 6,188,752 B1 | 2/2001 | Lesley |
| 6,189,031 B1 | 2/2001 | Badger et al. |
| 6,195,651 B1 | 2/2001 | Handel et al. |
| 6,198,431 B1 | 3/2001 | Gibson |
| 6,199,045 B1 | 3/2001 | GiNiger et al. |
| 6,205,330 B1 | 3/2001 | Winbladh |
| 6,208,854 B1 | 3/2001 | Roberts et al. |
| 6,208,870 B1 | 3/2001 | Lorello |
| 6,216,008 B1 | 4/2001 | Lee |
| 6,223,042 B1 | 4/2001 | Raffel |
| 6,223,046 B1 | 4/2001 | Hamill-Keays et al. |
| 6,226,529 B1 | 5/2001 | Bruno et al. |
| 6,246,879 B1 | 6/2001 | Segura et al. |
| 6,249,680 B1 | 6/2001 | Wax et al. |
| 6,249,744 B1 | 6/2001 | Morita |
| 6,263,212 B1 | 7/2001 | Ross et al. |
| 6,263,372 B1 | 7/2001 | Hogan et al. |
| 6,266,614 B1 | 7/2001 | Alumbaugh et al. |
| 6,289,373 B1 | 9/2001 | Dezonno |
| 6,311,055 B1 | 10/2001 | Boltz |
| 6,314,108 B1 | 11/2001 | Ramasubramani et al. |
| 6,317,594 B1 | 11/2001 | Gossman et al. |
| 6,321,257 B1 | 11/2001 | Kotola et al. ................ 370/465 |
| 6,327,479 B1 | 12/2001 | Mikkola |
| 6,330,600 B1 | 12/2001 | Matchefts et al. |
| 6,353,614 B1 | 3/2002 | Borella et al. |
| 6,366,961 B1 | 4/2002 | Subbiah et al. |
| 6,370,373 B1 | 4/2002 | Gerth |
| 6,389,421 B1 | 5/2002 | Hawkins et al. |
| 6,393,014 B1 * | 5/2002 | Daly et al. .................. 370/352 |

| | | | | | | |
|---|---|---|---|---|---|---|
| 6,393,461 B1 | 5/2002 | Okada | 6,667,688 B1 * | 12/2003 | Menard et al. | 340/531 |
| 6,396,913 B1 | 5/2002 | Perkins et al. | 6,711,411 B1 | 3/2004 | Ruffini | |
| 6,397,054 B1 | 5/2002 | Hoirup | 6,771,971 B2 | 8/2004 | Smith | |
| 6,408,177 B1 | 6/2002 | Parikh et al. | 6,785,659 B1 | 8/2004 | Landsman et al. | |
| 6,424,841 B1 | 7/2002 | Gustafsson | 6,856,804 B1 | 2/2005 | Ciotta | |
| 6,442,589 B1 | 8/2002 | Takahashi et al. | 6,970,869 B1 * | 11/2005 | Slaughter et al. | 707/10 |
| 6,459,892 B2 | 10/2002 | Burgan | 6,993,325 B1 | 1/2006 | Waesterlid | |
| 6,463,145 B1 | 10/2002 | O'Neal et al. | 7,116,972 B1 | 10/2006 | Zhang et al. | |
| 6,499,053 B1 | 12/2002 | Marquette et al. | 2001/0031641 A1 * | 10/2001 | Ung et al. | 455/456 |
| 6,502,086 B2 | 12/2002 | Pratt | 2001/0032267 A1 | 10/2001 | Collison | |
| 6,505,046 B1 | 1/2003 | Baker | 2001/0034224 A1 | 10/2001 | McDowell et al. | |
| 6,507,589 B1 | 1/2003 | Ramasubramani et al. . 370/465 | 2001/0041579 A1 | 11/2001 | Smith et al. | |
| 6,512,930 B2 | 1/2003 | Sanbergen | 2002/0091789 A1 | 7/2002 | Katariya | |
| 6,538,561 B2 | 3/2003 | Angus | 2002/0133568 A1 * | 9/2002 | Smith et al. | 709/219 |
| 6,560,456 B1 | 5/2003 | Lohtia et al. | 2003/0055912 A1 | 3/2003 | Martin et al. | |
| 6,564,261 B1 | 5/2003 | Gudjonsson et al. | 2004/0259531 A1 | 12/2004 | Wood et al. | |
| 6,587,691 B1 | 7/2003 | Granstam et al. | 2005/0078660 A1 * | 4/2005 | Wood | 370/352 |
| 6,591,304 B1 | 7/2003 | Sitaraman et al. | | | | |
| 6,654,786 B1 | 11/2003 | Fox et al. ............ 340/531 | * cited by examiner | | | |

MOBILE-ORIGINATED TO HTTP INTERNET COMMUNICATIONS

The present application claims priority from U.S. Provisional Patent Application Ser. No. 60/198,108, entitled "Short Messaging Service Center SMPP to HTTP Internet Communications", filed on Apr. 18, 2000, and from U.S. patent application Ser. No. 09/588,460, entitled "Short Messaging Service Center Mobile-Originated to HTTP Internet Communications," filed on Jun. 6, 2000, now U.S. Pat. No. 6,891,811 issued on May 10, 2005.

A suitable wireless Internet gateway 126 is described in co-owned U.S. Application No. 60/199,367, filed on Apr. 11, 2000, entitled "Wireless Internet Gateway", by Richard Smith, the entirety of which is expressly incorporated herein by reference.

BACKGROUND OF THE INVENTION

1. Field of the Invention

This invention relates generally to communications networks. More particularly, it relates to the communication between a mobile (i.e., wireless) device and an application server via a short message service center (SMSC) and the Internet.

2. Background of Related Art

Wireless communication services are in increasing demand in response to a society which is becoming increasingly mobile. Traditionally, wireless communication services include voice cellular phone and paging services in which a user can make a telephone call or send/receive a page including a numeric message indicating a telephone number over a wireless network. More recently, paging services have been expanded to offer alphanumeric paging, which allows a short text based message to be sent to and displayed at a handheld pager.

However, voice cellular telephone and the paging services each require an intended subscriber to be on-line or active to receive a telephone call or transmitted paging message. In other words, these services do not typically offer the capability of storing the messages for a temporarily unavailable subscriber.

In the early 1990s, as a result of the growing popularity of digital wireless technology, a standard for digital wireless networks was introduced in Europe. That standard, now known as the global standard for mobiles (GSM), included a service called short messaging service (SMS). An SMS allows transmission of short messages, typically up to 160 characters, to and from communication devices, e.g., cellular telephone handsets, telephones or computers with appropriate modems. In North America, the SMS is currently implemented on digital wireless/mobile networks, such as a PCS network based on the GSM standard, code division multiple access (CDMA) and/or time division multiple access (TDMA) methods. Short message services are gaining in popularity, particularly in the United States.

Short message services are advantageous over text based paging services because of the capability of bi-directional communication. Such bi-directional communication allows, for example, notification to the originating device of the success or failure of the short message delivery.

Each SMS network typically includes a short message service center (SMSC) which acts as a store-and-forward mechanism providing guaranteed delivery of short messages to a subscriber, even if the subscriber is inactive when the message was transmitted, by delivering the short messages once the subscriber becomes active. Delivery of all short messages is guaranteed regardless of whether or not the intended subscriber is "on-line" because the transmitted short message is stored within the SMS network and delivered to the intended subscriber from their assigned SMSC when the subscriber becomes available.

A variety of services have been introduced using SMS networks including, for example, integrated electronic mail and fax, integrated paging, interactive banking, and information services such as stock quotes and airline schedule delivery.

In operation, an SMSC receives a short message from any source intended to be delivered to a particular subscriber. When the intended subscriber is not available because, for example, it is turned off or is outside of the service area of the SMS network, the attempt to deliver the short message at that time will fail. In this case, the short message will be retained in the SMS network for a later delivery attempt. Thereafter, when the subscriber finally becomes available, e.g., is turned on or has moved into the service area of the SMS network, the relevant portions of the network (e.g., the mobile servicing center (MSC) and the home location register (HLR)) notify the SMSC to initiate delivery of the stored (i.e., previously failed) short messages.

FIG. 6 shows an exemplary structure of a SMS network 500. Although the following example is described using terms and protocols mainly as defined by the North American standard IS-41, it will be apparent to one skilled in the art that the example is applicable to any networks that offer store-and-forward type short message service.

The SMS network 500 typically includes one short message service center (SMSC) 501. The SMSC 501 typically includes a storage subsystem to store short messages that had failed to be delivered. The SMSC 501 typically further includes various interfaces (not shown) to receive short messages originating from various sources and protocols, such as a Voice Mail System (VMS) 508, paging networks using, e.g., Telocator Numeric Paging Protocol (TNPP) 509, devices using the Short Message Peer-to-Peer (SMPP) protocol 510 via TCP/IP, e-mail systems using the Simple Mail Transport Protocol (SMTP) 511, and/or devices using the Telocator Alphanumeric Protocol (TAP) 512. Some of the various sources of the short messages may be gateways to other networks.

The SMSC 501 may further include a gateway/interworking block (not shown) that enables the SMSC 501 to communicate with the rest of the SMS network 500, such as a Home Location Register (HLR) 503 or a Mobile Switching Center (MSC) 505, using the Signaling System No. 7 (SS7) 502. The methods and mechanism of communication in the SMS network 500 are defined by the mobile application part (MAP) layer, which uses the services of the SS7 transaction capabilities application part (TCAP) as the signaling infrastructure of the SMS network 500. The protocol for the signaling is referred to as the IS-41 protocol under the American standard as published by the Telecommunication Industry Association (TIA) or as the GSM MAP under the European standard published by European Telecommunication Standards Institute (ETSI).

The Home Location Register (HLR) 503 includes a database that permanently stores and manages subscriptions and service profiles of users having a subscription to the SMS network 500. Although only one HLR 503 is shown, the SMS network 500 may include two or more HLRs. The SMS network 500 also typically includes several visitor location registers (VLR) 504. A VLR 504 is a database temporarily holding information about visiting subscribers who move into its service area. Thus, a VLR 504 contains information regarding routing information for all subscribers within its service area, and informs the relevant HLR 503 of the availability and routing information regarding its subscribers. The mobile switching center (MSC) 505 obtains subscriber information from the VLR 504 to service visiting subscribers.

The mobile switching center (MSC) 505 performs switching and call control functions, and receives short messages from the SMSC 501 for delivery to the appropriate mobile subscriber 507 (shown, e.g., as a cellular phone handset). It is to be understood that, although only one MSC 505 is shown, the wireless network 500 may include two or more MSCs.

The base station subsystem (BSS) 506 handles the wireless communications, e.g., RF transmission and reception of voice and data traffic, to and from the mobile subscriber 507. The BSS 506 is typically composed mainly of two parts: the base transceiver station (BTS, not shown) which houses the radio transceivers that define a cell and handles the radio-link protocols with the mobile subscriber 507, and the base station controller (BSC, also not shown) which manages the radio resources, and handles radio channel set up, frequency hopping, and handoffs (or handovers as is sometimes referred as). The BSC is the interface between the MSC 505 and the subscriber 507. The subscriber 507, also sometimes referred to as a mobile station (MS), typically consists of mobile equipment (e.g., a cellular phone handset) preferably uniquely identifiable by an identifying number, e.g., mobile identification number (MIN), International mobile subscriber identification (IMSI) and/or electronic serial number (ESN), for the subscriber 507. The mobile equipment may include a storage area, e.g., a flash memory, a ROM, a RAM or the like to hold the unique identifying number within the mobile equipment. In GSM networks, a smart card, typically referred to as a subscriber identity module (SIM) is utilized to store a unique identifying number.

FIG. 7 shows an exemplary flow of a short message through a conventional SMS network. Although FIG. 7 shows only an example of short message delivery to a mobile subscriber, it is to be understood that a mobile subscriber or any other sources may originate a short message. The flow of a mobile subscriber originated short message would involve similar processes as the following mobile subscriber terminated short message example, and would be apparent to one of ordinary skill in the art.

The SMSC 601 receives a short message intended for a subscriber 604 from a source of short message 605 which may be any one or more of the aforementioned sources of short messages, e.g., 508-512 of FIG. 6. Upon receiving a short message, the SMSC 601 sends a request for routing information, i.e., an SMS request (SMSREQ), to the HLR 602. The HLR 602 maintains information regarding the availability of the intended subscriber 604 and the appropriate MSC 603 that services the intended subscriber, and sends the information as routing information 608 back to the SMSC 601. The SMSC 601 forwards the short message to the appropriate MSC 603 using the routing information 608 received from the HLR 602, for example, in accordance with the short message delivery point-to-point (SMDPP) mechanism of IS-41 standard. The MSC 603 queries the VLR (not shown) for subscriber information. The VLR may perform a paging and authentication process, and sends the subscriber information to the MSC 603. The MSC 603, using the information received from the VLR, delivers the short message to the intended subscriber 604, and sends a delivery report 612 to the SMSC 601. The SMSC 601 may send the result of the delivery, i.e., the status report 613, to the source of the short message 605 if requested.

When the attempted delivery of the short message has failed because, for instance, the intended user was out of the service area, or had his or her communication device turned off, the MSC 603 informs the HLR 602 of the failure. The HLR 602 then turns on an SMS notification indicator flag for the subscriber, and the SMSC 601 retains the failed message for a later delivery attempt.

FIG. 8 shows a pending short message delivery process in a conventional short message service network after the mobile subscriber becomes available for delivery of the retained messages. In particular, in FIG. 8, when the subscriber 704 turns his or her handset on or comes within the service area, the subscriber's handset sends a registration signal 709 to the MSC 703. The registration signal 709 may or may not include authentication process.

Upon receiving the registration signal 709, the MSC 703 informs the HLR 702 (or the VLR 711) of the availability of the subscriber 704 by sending a subscriber available signal 708. Because the SMS notification flag for the subscriber is on, the HLR 702 or the VLR 703 sends an SMS notification (SMSNOT) message 705 in case of networks implementing IS-41 standard, or an equivalent notification alerting the fact that the subscriber has become available in networks implemented in accordance with other standards, to the SMSC 701 assigned to service that particular intended subscriber 704.

The SMSC 701 then sends a delivery request 706 to the MSC 703 via, for example, the SMDPP protocol in the IS-41 standard. The MSC 703 finally delivers the short message 710 to the subscriber 704, and sends a message delivered message 707 back to the SMSC 701 to confirm and finalize the delivery of the short message. The SMSC 701 may further send a delivery report to the source of the short message if it was requested.

The Wireless Application Protocol (WAP) attempts to standardize a mechanism for two-way communications. However, WAP requires that a special browser be loaded on the handset, and requires the user to enter into a dedicated 'browser mode' in order to interact with 2-way services.

There is a need for a standardized solution allowing short message communications between wireless devices and application servers on the Internet without the need for a specialized browser, while making use of existing communication standards utilized by standard SMSCs, e.g., SMPP.

SUMMARY OF THE INVENTION

In accordance with the principles of the present invention, a gateway comprises a first communication path to accept a short message from a short message service center. A translation module inserts the short message into an HTTP protocol message. A second communication path transmits the HTTP protocol message to at least one URL.

A method of communicating between a wireless device and an application program on an Internet Protocol server in accordance with another aspect of the present invention comprises sending a short message from the wireless device to the Internet Protocol server. The short message is routed using a wireless protocol message. The short message is conveyed to the Internet Protocol server using an HTTP protocol POST message.

A mobile to HTTP gateway application in accordance with yet another aspect of the present invention comprises an SMPP relayer, a message director to process messages from the SMPP relayer, a poster collector to obtain at least one target poster, and a poster.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides a mobile-to-HTTP protocol gateway (MHG, or "MO Gateway") which translates between standard wireless protocol commands (e.g., SMPP from an SMSC), and an application server on the Internet (i.e., a "Web Server").

An MHG in accordance with the principles of the present invention allows any standard 2-way SMS capable handset to interact with specialized web applications. Using an MHG, it is no longer necessary for a user to launch a phone browser in order to access the services. Moreover, an MHG provides a simpler model than WAP for developing 2-way applications.

The disclosed embodiment of an MO-HTTP gateway uses the SMPP protocol. However, the principles of the present invention relate equally to other 2-way messaging protocols, e.g., ReFlex for 2-way pagers.

The MO-HTTP gateway provides a mechanism for developers to produce 2-way wireless applications using familiar Web-based tools and methodologies. The MO-HTTP gateway hides the details of communicating with the wireless network by interacting with applications using familiar HTTP posting. By adopting SMS and SMPP for its reference implementation, the MO-HTTP gateway avoids problems common to the WAP environment.

Utilizing an MHG in accordance with the principles of the present invention, a developer may create mobile applications using standard Web development tools, e.g., Java Servlets.

Figure 1:
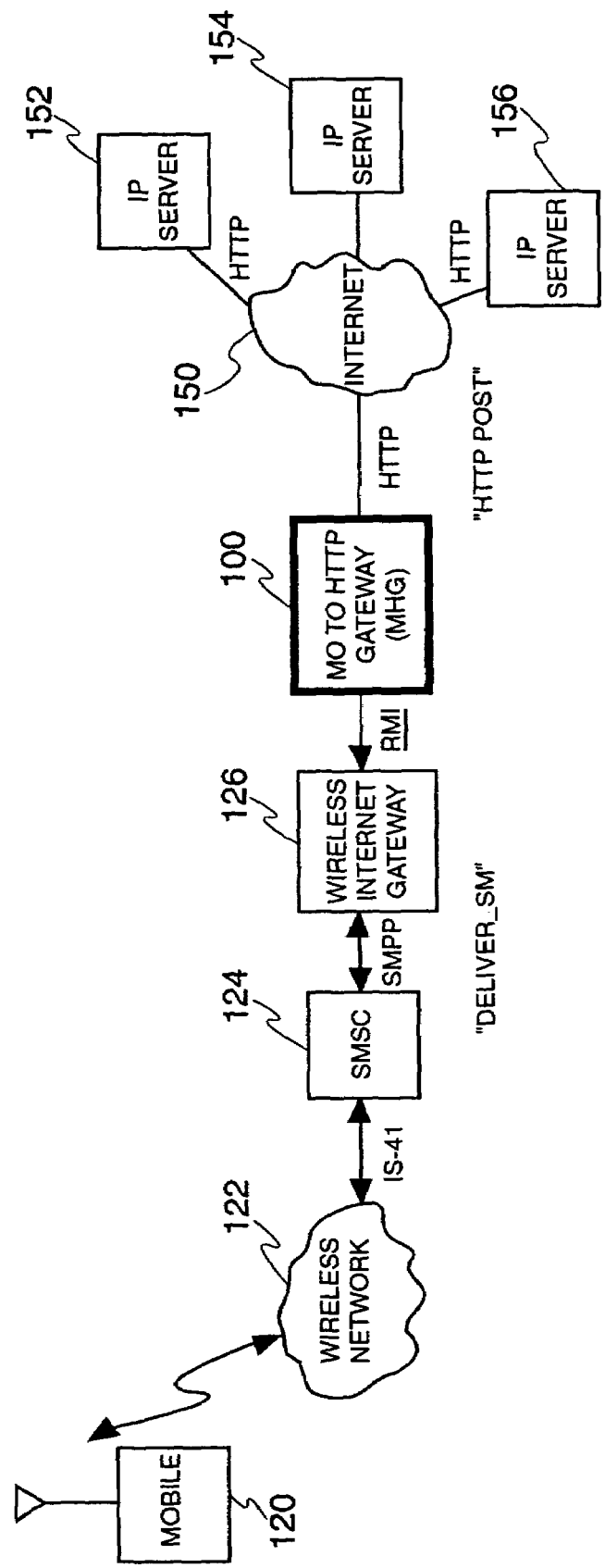
FIG. 1 illustrates an exemplary system adapted to push mobile originated (MO) messages to an IP (web) sever, in accordance with the principles of the present invention.

FIG. 1 illustrates an exemplary system adapted to push mobile originated (MO) messages to an IP (web) sever using standardized equipment and message protocols together with an MHG 100, in accordance with the principles of the present invention.

In particular, as shown in FIG. 1, a mobile (i.e., wireless) device 120 communicates with an appropriate wireless network 122 using any appropriate wireless standard protocol. In turn, the wireless network 122 communicates with a short message service center 124 using standard IS-41 communication protocol messages.

Appendix A attached hereto is a document entitled "SHORT MESSAGE PEER TO PEER (SMPP) INTERFACE SPECIFICATION" describing relevant features of mobile originated communications using Short Message Peer-to-Peer Protocol (referred to herein as SMPP).

The SMSC 124 communicates with a wireless internet gateway 126 via SMPP protocol commands in substantial conformance with the SMPP interface specification attached hereto in Appendix A.

A suitable wireless Internet gateway 126 is described in co-owned U.S. Appl. No. 60/_____, filed on _____, 2000, entitled "Wireless Internet Gateway", by Richard Smith, the entirety of which is expressly incorporated herein by reference.

The wireless Internet Gateway 126 communicates with a MHG 100 using Java Remote Method Invocation (RMI) technology to provide server-to-server capability.

The mobile to HTTP Gateway (MHG) 100 translates standard format RMI protocol commands from the wireless Internet gateway 126 into HTTP protocol commands, and directs the same to an appropriate Internet protocol (IP) server (i.e., web application server) 152, 154, and/or 156 in communication with the Internet 150.

Figure 2:
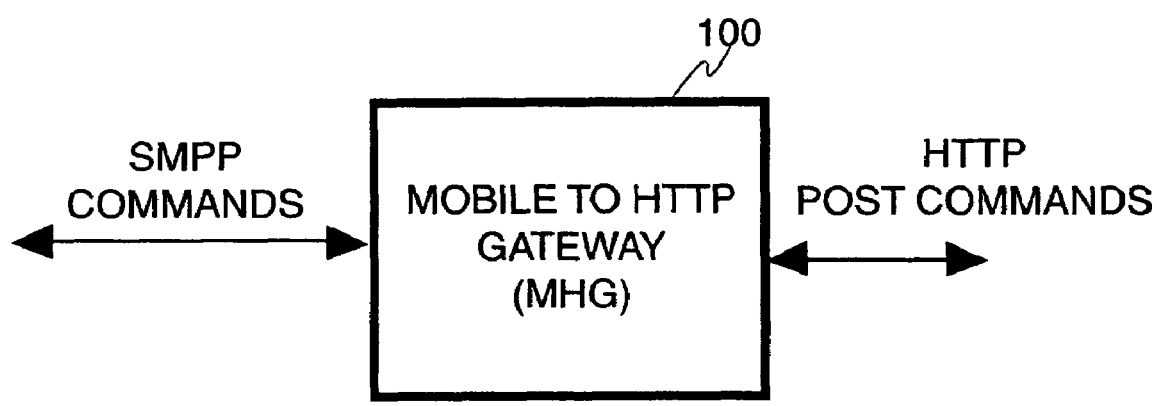
FIG. 2 depicts a mobile-to-HTTP gateway (MHG) as a 'black box' which is easily installed into existing systems to enable bi-directional communication between a mobile device and one or more IP servers within the parameters of standard protocol communications (e.g., SMPP and HTTP) between system elements, in accordance with the principles of the present invention.

FIG. 2 depicts the MHG 100 as a 'black box' which is easily installed into existing systems to enable bi-directional communication between a mobile device 120 and one or more IP servers 152-156 within the parameters of standard protocol communications (e.g., SMPP and HTTP) between system elements, in accordance with the principles of the present invention.

In particular, as shown in FIG. 2, the mobile to HTTP gateway (MHG) 100 preferably is bi-directional in that it generates HTTP protocol POST commands to an application program on a relevant IP server 152-156 based on mobile-originated messages, and translates responses to the same from HTTP protocol back into standard format SMPP messages for forwarding back to the relevant mobile device 120.

In accordance with the principles of the present invention, an HTTP protocol POST command is used by the MHG 100 to forward a request from the mobile device 120 to the relevant web IP server(s) 152-156. The HTTP protocol POST command is well known and documented in, e.g., RFC2068 and later IETF RFC's on the subject. This document is publicly available, e.g., at http://ietf.org/rfc.html.

In particular, as is known within the HTTP protocol, an HTTP protocol POST command is used to request that a particular destination web IP server 152-156 accept the entity enclosed in the request (i.e., the mobile device 120) as a new subordinate of the resource identified by the Request-URI in the Request-Line.

The HTTP protocol POST command is designed to allow a uniform method for various tasks, e.g., to allow annotation of existing resources, to allow posting of a message to a bulletin board, newsgroup, mailing list, or similar group of articles, to provide a block of data, such as the result of submitting a form, to a data-handling process, and/or to extend a database through an append operation. The actual function performed by the HTTP protocol POST method is determined by the particular web IP server 152-156, and is usually dependent on the Request-URI. The posted entity (i.e., the wireless device 120) is subordinate to that URI in the same way that a file is subordinate to a directory containing it, a news article is subordinate to a newsgroup to which it is posted, or a record is subordinate to a database.

The action performed by the HTTP protocol POST command might not result in a resource that can be identified by a URI. In this case, either 200 (OK) or 204 (No Content) is the appropriate response status, depending on whether or not the response includes an entity that describes the result. If a resource has been created on the origin server, the response should be 201 (Created) and contain an entity which describes the status of the request and refers to the new resource, and a location header.

Responses to the HTTP protocol POST are not cachable, unless the response includes appropriate Cache-Control or Expires header fields. However, the 303 (See Other) response can be used to direct the user agent to retrieve a cachable resource.

With respect to the MHG 100, the submitted HTTP protocol POST command includes mobile_num, resp_track_id and body fields. Also embedded within the HTTP protocol POST command is a CGI name/value pair providing information about the particular request from the mobile device 120.

A response back to the mobile device 120 originates from the relevant web IP server 152-154 synchronously in response to the received HTTP protocol POST command.

Particular features of the standard SMPP utilized by various aspects of the present invention include the following:

Use of a registered_delivery flag.
Use of an "$R" trigger in the body of every MO message indicating a source-unique tracking number for SMPP v3.3, version 3.4 provides an explicit field for a tracking number and therefore the trigger is not required.
Use of user responses contained within the stat component of a standard delivery receipt.
Use of message types identified by the esm_class field.

Figure 3:
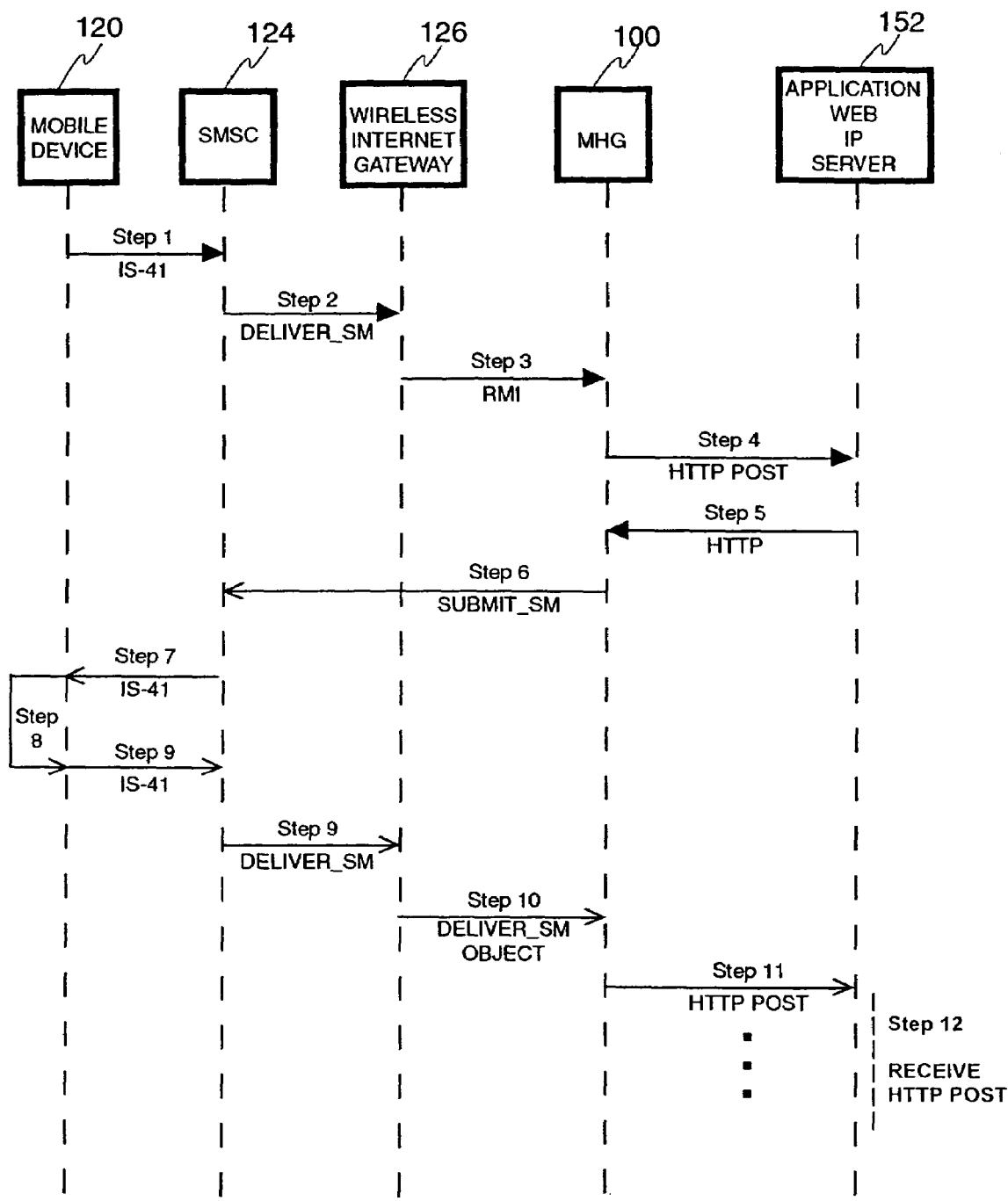
FIG. 3 shows a message flow between the system elements shown in FIG. 1.

FIG. 3 shows an exemplary message flow between the system elements shown in FIG. 1.

In particular, the following steps 1 to 12 are depicted between system elements in FIG. 3 as an example of message routing between a mobile device 120 and a relevant web IP server 152-154.

Step 1

The mobile device 120 sends a short message to a pre-defined address (e.g., 'info', or 4636). If the body of the short message is empty, or if the body contains a special string such as 'menu', then ultimately a menu would be sent by the HTTP Application on the relevant web IP server 152-156 to the mobile device 120.

Other bodies may be used to, e.g., identify global commands, or provide context-sensitive information from the mobile device 120 to the HTTP application on the web IP server 152-156. Requirements for body content depend on the particular HTTP application as it exists on the particular web IP server 152-156.

Step 2

The SMSC 124 routes the short message to an ESME (e.g., the wireless Internet gateway 126) for delivery using a standard SMPP protocol DELIVER_SM message. As disclosed, the MHG 100 utilizes the following fields of the DELIVER_SM command: service_type, source_addr, destination_addr, registered_delivery_flag, esm_class, and short_message.

In particular, the MHG 100 utilizes the service_type parameter to indicate the SMS application service associated with the message. For instance, the service_type field may be populated with the value 'page'.

The source_addr is the address of the SME (e.g., mobile device 120) that originated the short message. As disclosed, the source_addr is the Mobile Identification Number (MIN) of the mobile device 120 making the request.

The destination_addr is the address of the destination SME. As disclosed, the destination_addr may be assumed to be '4636' as indicated in Step 1 above. This address is used to route the request to the appropriate HTTP URL.

The registered_delivery_flag indicates if an SME Acknowledgement is necessary. As disclosed, the registered_delivery_flag is set to a default value of 0, which indicates that no delivery receipt is requested.

The esm_class indicates the message type and Enhanced network services.

The short_message field contains up to 254 octets of short message user data.

Thus, key fields of the DELIVER_SM command may be populated by the MHG 100 as follows:

| | |
|---|---|
| service_type: | page |
| source_addr: | mobile's MIN |
| destination_addr: | 4636 |
| registered_delivery_flag: | 0 |
| esm_class: | 0 |
| short_message: | $R[new ref id]$M[message] |

The $R in the short_message is optional, and is applicable for use with SMPP v3.3. The $R may be used when correlating responses from the mobile device 120 to Reply-request messages from the application program on the relevant web IP server 152-156. For consistency, the $R is preferably always present in short messages from the mobile device 120.

Step 3

When the wireless Internet gateway 126 receives the SMPP message from the SMSC 124, it creates a DELIVER_SM object. The DELIVER_SM object is forwarded by the wireless Internet gateway 126 to any relevant remote applications that are registered to receive messages on a specified ports/link ID, e.g., the MHG 100 if the MHG 100 is registered with the wireless Internet gateway 126 to receive SMPP messages. The transmission is accomplished through an RMI callback mechanism.

Step 4

The MO-HTTP Gateway (MHG) 100 receives the DELIVER_SM message object from the wireless Internet gateway 126, and formulates an HTTP protocol POST command message to a web server on the Internet 150 to convey the message content. The MHG 100 can direct the HTTP protocol POST command messages to one or to multiple URLs.

The particular web server to reference is determined by the included destination address, assuming that the SMPP destination address field contains the targeted number, e.g., '4636'. The HTTP protocol POST command message may be routed based on the SMPP port utilized.

As disclosed, exemplary name/values that may be utilized in the HTTP protocol POST command message sent to the web server are the mobile_num, resp_track_id, and body.

The mobile_num may be the mobile identification number (min) identifying the originating mobile number of the relevant mobile device 120.

The resp_track_id may be the reference ID (ref id) for user acknowledgements used to track questions and related answers.

The body may be the payload content from the mobile device 120 included in the message body field.

As embodied, by default, only SMPP messages with esm_class values of '0' and '16' are forwarded by the wireless Internet gateway 126 to the web IP server 152-156. That is, only new mobile originated requests and/or menu responses are forwarded.

If, for instance, the SMPP message type is '16', then the resp_track_id variable may contain the reference ID. On the other hand, if the message type is '0', then the reference ID is not passed to the relevant web IP server(s) 152-156.

Utilization of the SMPP message type and inclusion/non-inclusion of the reference ID reduces network traffic and resource requirements, and simplifies development on the web side.

Step 5

The relevant web server in the Internet 150 receives the HTTP protocol POST command information, which may be handled by the actual CGI/Servlet routine specified by the URL in Step 4.

The handling servlet may create sessions for each mobile device such that the current state of the mobile device may be preserved, allowing meaningful content to be transmitted. Example wireless web applications may include menu-based services, games, and information services.

After the servlet of the web server in the Internet 150 receives the HTTP protocol POST command, the servlet synchronously returns data through the HTTP stream back to the MHG 100. The text returned by the servlet may be delivered to the mobile device 120 as a standard SMS message.

The returned data may be contained within an <SMS> and </SMS> tag-set. The <SMS> and </SMS> tags are special tags used by the MHG 100 to denote SMSC Type data. As the number and/or variety of applications increase, additional tags may be implemented.

As disclosed, there are several fields embedded within the <SMS> and </SMS> tags: mobile_num, resp_track_id, and body.

The mobile_num field includes a mobile identification number of the mobile device 120 that a relevant short message is destined for.

The resp_track_id field includes a unique identification number generated by the servlet. The MHG 100 returns this id to the servlet for responses.

The body field includes the text to send to the desired mobile device 120. If the body field is blank, then nothing will be sent to the mobile device 120.

If the servlet requires a single-button user response (e.g., for a menu), then the "<RESP_TRACK_ID value='x'>" tag can be included prior to the </SMS> tag. This tells the system that a menu is required and that the specified unique tracking number should be used.

When the user of the mobile device 120 responds to this message, this same tracking id may be returned in the resp_track_id cgi variable.

For ease of description of some of the following steps, an example using the scenario described above is introduced wherein the servlet returns the following:

<SMS> Do you like cookies (Y/N)?
        <RESP_TRACK_ID value="1234"> </SMS>

Step 6

After having posted its data to the web server in the Internet 150, the MHG 100 receives a response from the same connection, as described in Step 5. A standard SUBMIT_SM MT message is generated from the text received within the <SMS> tag set.

In particular, the SUBMIT_SM message is issued by the ESME (e.g., the wireless Internet gateway 126) to submit a short message to the SMSC 124 for transmission to a specified mobile device 120. In creating a SUBMIT_SM message destined for the SMSC 124, the conventional SMPP Protocol specification is followed, with the exception of the following mapping implemented between the SUBMIT_SM message and data received in the <SMS> and </SMS>.

A registered_delivery_flag in the SUBMIT_SM message informs the SMS that the ESME (wireless Internet gateway) 126 requires a notification when the message has been delivered. If the RESP_TRACK_ID is provided (i.e., contains a value), then the registered_delivery_flag field is set to '8' for the MHG 100 indicating 'SME Manual/User Ack requested', and a special tag of R$[track id] is included in the message body. Preferably, this same tracking id will be returned in the response message from the mobile device 120.

A short_message in the SUBMIT_SM message is the payload containing up to 160 bytes of data that should be transmitted to the mobile device 120. An empty body indicates that no message is to be sent to the mobile. If the RESP_TRACK_ID value is set, then a special tag of "$R" concatenated with the value from the RESP_TRACK_ID and the tag "$M" must be prepended to the short message.

The other fields of the SUBMIT_SM message are used as conventionally known and described in the SMPP Protocol.

Step 7

The SMSC 124 receives the SUBMIT_SM message and delivers a short message, with manual ack request, to the mobile device 120.

Step 8

The mobile device 120 responds to the "Do you like cookies?" question, e.g., by pressing '9' for Yes.

Step 9

The SMSC 124 receives the response from the mobile device 120 and formulates a DELIVER_SM message. The formulated DELIVER_SM message is forwarded to the wireless Internet gateway 126.

Key parameters in the DELIVER_SM message may be populated as follows:

| | |
|---|---|
| service_type: | page |
| source_addr: | [mobile's MIN] |
| destination_addr: | 4636 |
| registered_delivery_flag: | 0 |
| esm_class: | 16 |
| short_message: | R1234$[Response Value] |

The response code is shown directly after the $M value.

Step 10

The wireless Internet gateway 126 receives the DELIVER_SM message from the SMSC 124, converts the DELIVER_SM message into an object, and forwards the DELIVER_SM message to any listeners (e.g., the MHG 100). In the disclosed example, the MHG 100 may be listening to the wireless Internet gateway 126 on a specified port, and therefore receive the DELIVER_SM message from the specified port.

Step 11

The MHG 100 receives the DELIVER_SM object, and determines if the esm_class is '16'. If so, the short message is translated by the MHG 100 and forwarded to its web listeners.

A URL is associated with either the SMPP link ports or the destination address through a configuration file of the MHG 100. The MHG 100 therefore formulates an HTTP protocol POST command message to the appropriate URL(s).

As disclosed, the HTTP protocol POST command message may contain the following name/value pairs:

mobile_num=[mobile num]
resp_track_id=123
body=9

To ease the burden of the web developer, the MHG 100 may include the response code only for messages where esm_class='16'. Thus, if the esm_class is not '16', the response code need not be included. Regardless of how the MSG 100 receives it, it need pass only the response code in the body field.

Step 12

The servlet associated with the specified URL receives the HTTP protocol POST command message from the MHG 100.

The servlet may retrieve a session object for the particular value of the mobile_num, and determines that it had just asked the mobile device 120 about a cookie preference.

The servlet may confirm that the query's tracking ID correlates to the resp_track_id value. Thus, the servlet knows that the response at hand is in response to that question. Since the body contains the content '9' (or 'Y' or other suitable response), the servlet may rightfully conclude that the user of the mobile device 120 (who input the '9' response) likes cookies.

A conversation or communication between the mobile device 120 and an application on one or more particular web IP servers 152-156 may continue on as described in steps 1 to 12 indefinitely.

Figure 4:
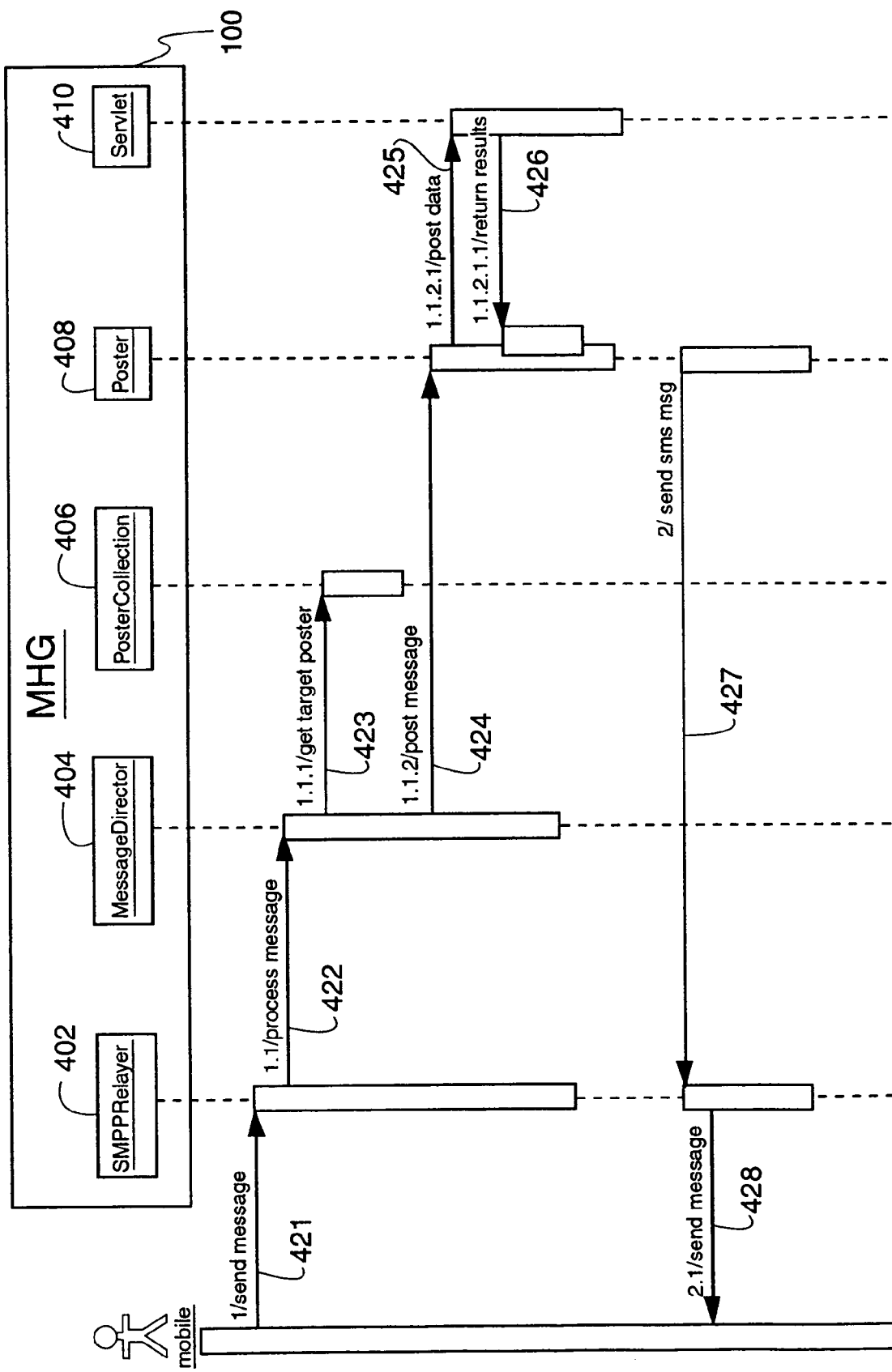
FIG. 4 shows software elements of an exemplary MO-HTTP Gateway (MHG) 100, in accordance with the principles of the present invention.

FIG. 4 shows software elements of an exemplary MO-HTTP Gateway (MHG) 100, in accordance with the principles of the present invention.

In particular, as shown in FIG. 4, the software elements of the MHG 100 include an SMPPRelayer 402, a MessageDirector 404, a PosterCollection 406, a Poster 408, and a Servlet 410.

In accordance with the principles of the present invention, one or more SMPPRelayers 402 will register as listeners to specified link IDs of the wireless Internet gateway 126.

In message 421 shown in FIG. 4, SMPP messages are sent by the wireless Internet gateway 126 to the SMPPRelayer 402 of the MHG 100 as they are received.

In message 422, the SMPPRelayer 402 forwards each message to a MessageDirector 404.

In message 423, the MessageDirector 404 retrieves a Poster 408 from the PosterCollection 406, and then in message 424 tells the Poster 408 to process the SMPP Message.

In message 425, the Poster 408 converts the SMPP Message into an HTTP protocol POST command request 425 to a specific universal resource locator (URL), and receives return results back in message 426.

In message 427, the Poster 408 returns the results back to the SMPPRelayer 402, so that it will be sent to the mobile device 120, as depicted in message 428.

Figure 5:
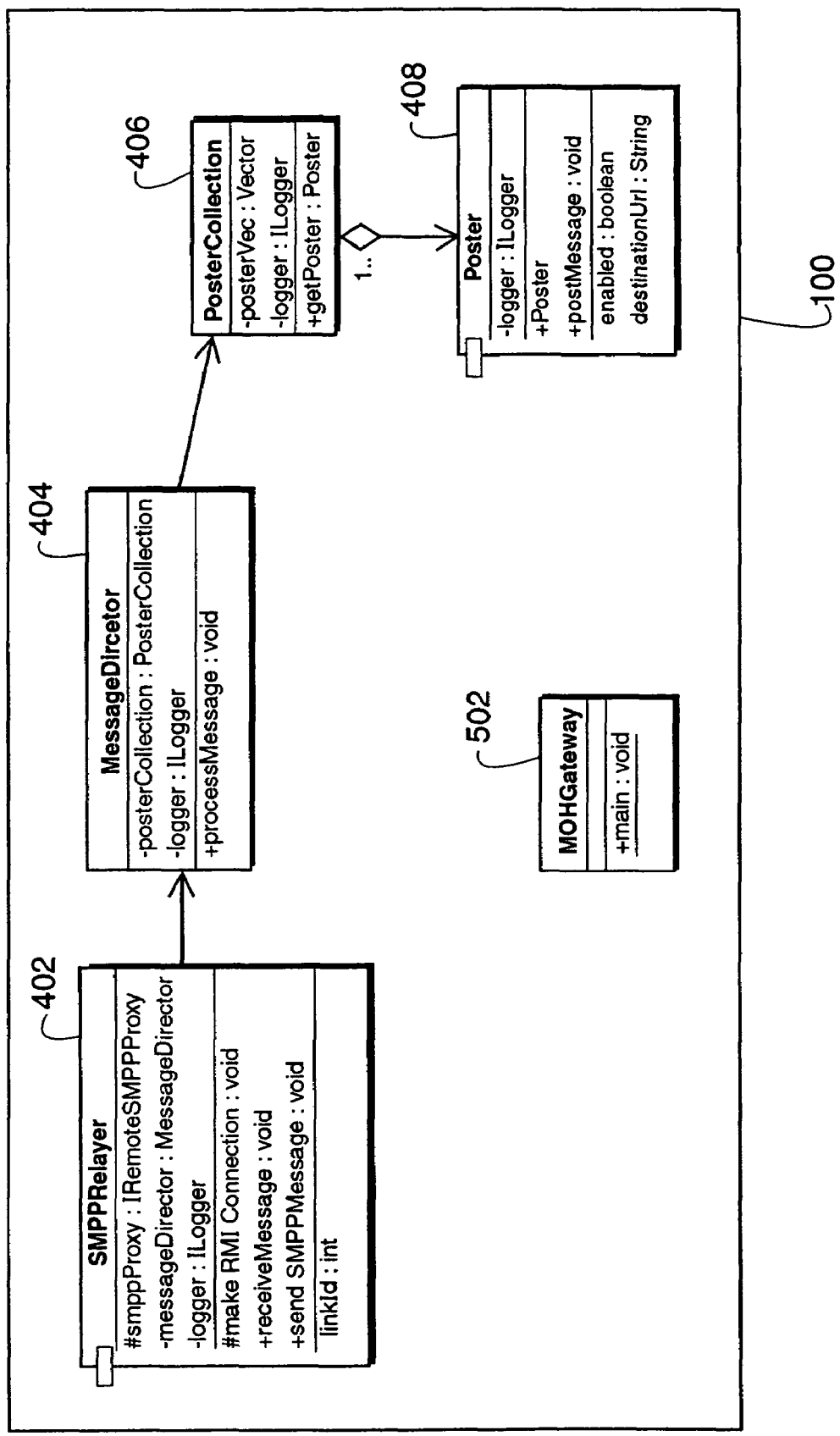
FIG. 5 shows various classes in an exemplary embodiment of a MHG 100, in accordance with the principles of the present invention.
Figure 6:
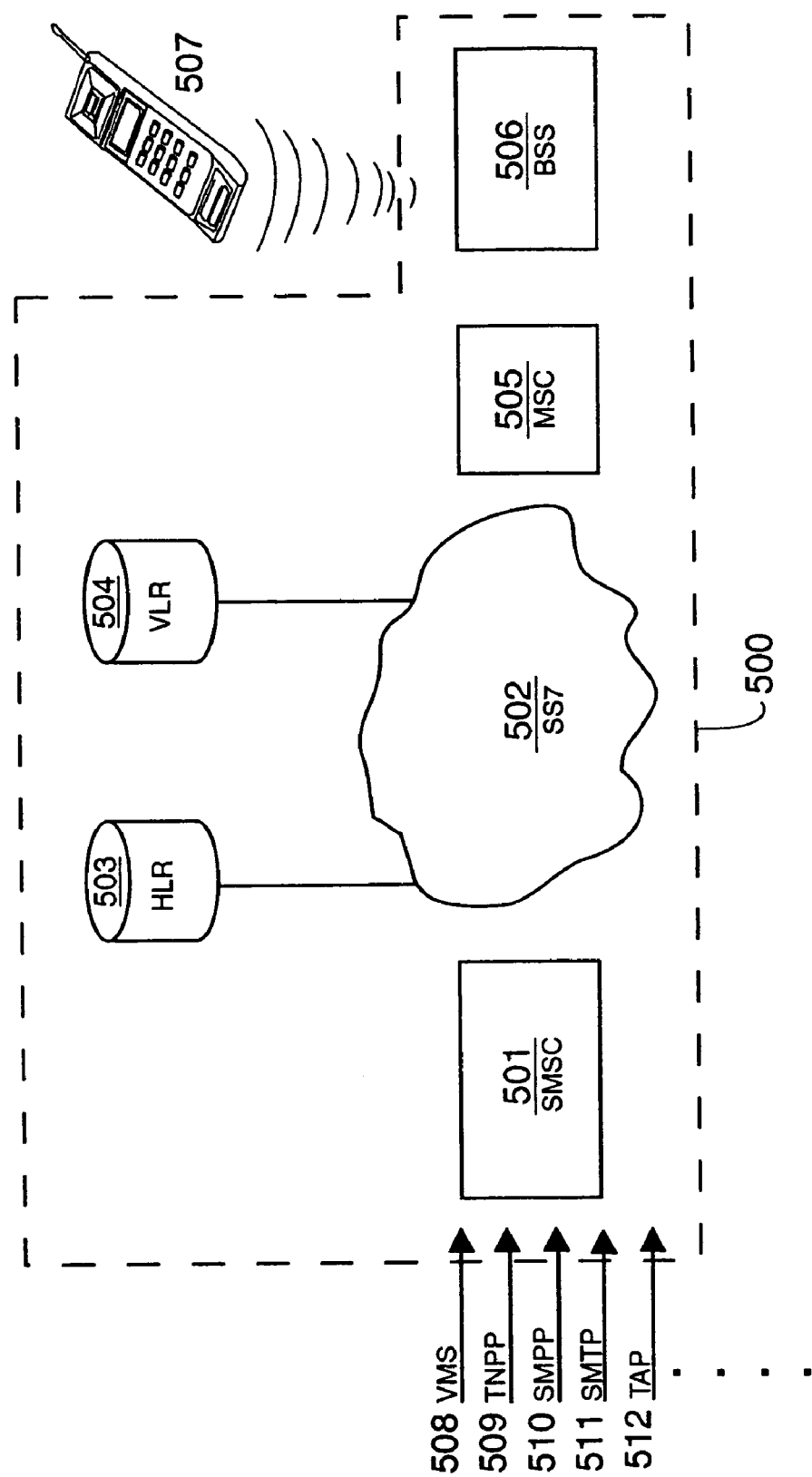
FIG. 6 shows relevant portions of a conventional short message service network.
Figure 7:
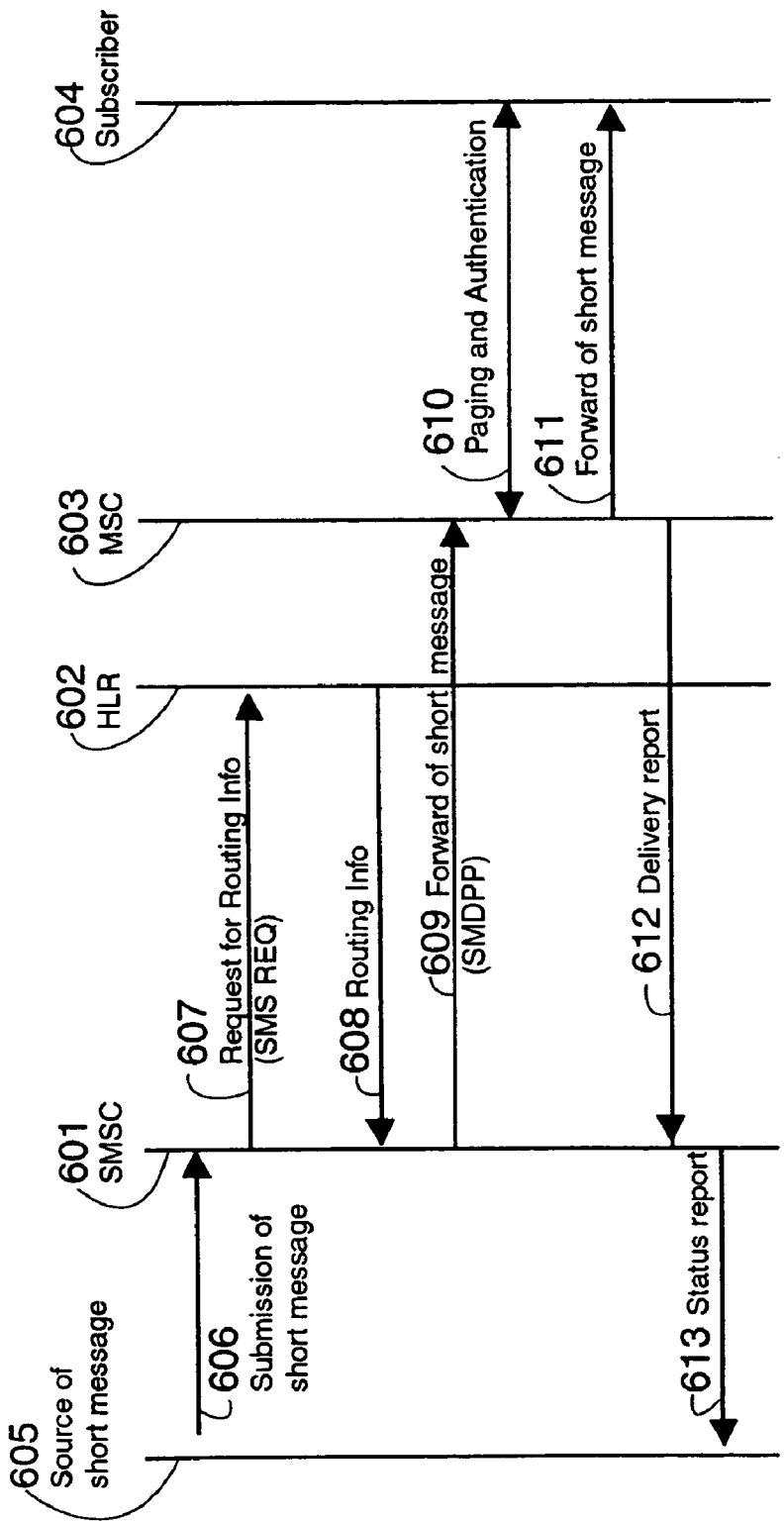
FIG. 7 shows a process of short message flow within a conventional short message service network.
Figure 8:
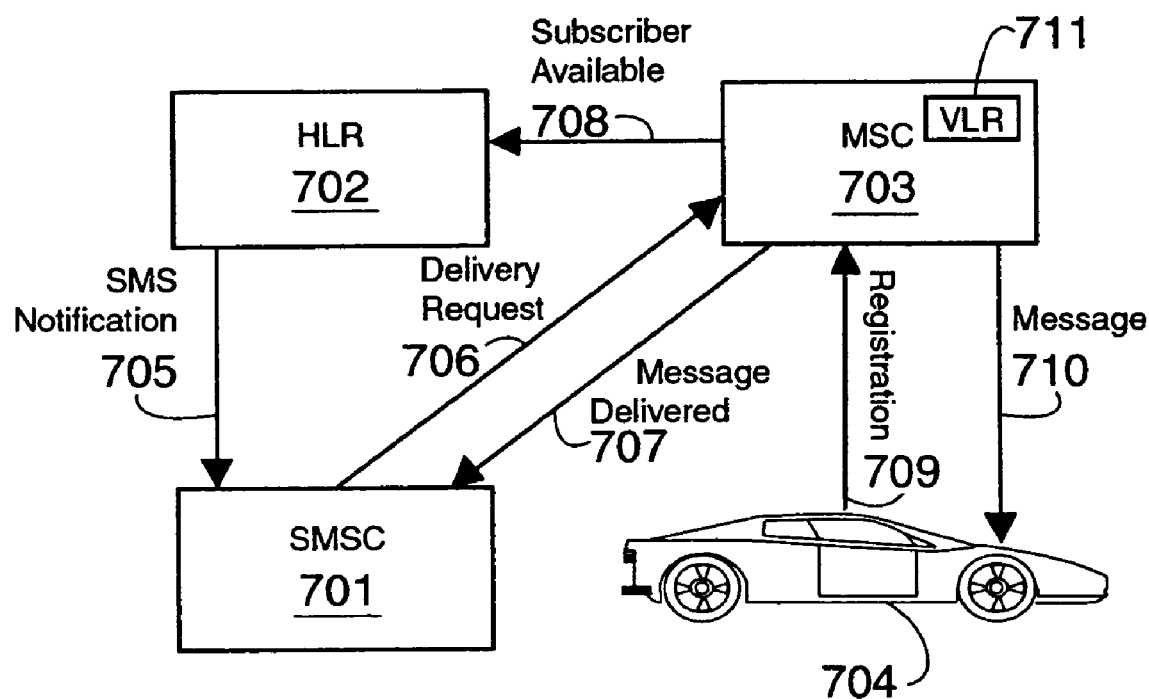
FIG. 8 shows a pending message delivery process in a conventional short message service network.

FIG. 5 shows various classes in an exemplary embodiment of a MHG 100, in accordance with the principles of the present invention.

In particular, as shown in FIG. 5, the MHG 100 includes a MOHGateway class 502, an SMPPRelayer class 402, a MessageDirector class 404, a PosterCollection class 406, and a Poster class 408.

The MOHGateway class 502 defines "main( )", and upon execution will create the SMPPRelayer class 402, the MessageDirector class 404, and the PosterCollection class 406, assigning references to one another as appropriate.

The PosterCollection class 406 accesses a standard application resource class to determine the number of Posters 408 required, as well as the desired configuration of each Poster 408. The PosterCollection class 406 creates the Posters 408 and provides references to the Posters 408 through a getPoster(SMPPMessage msg) method.

The SMPPRelayer class 402, the MessageDirector class 404, the PosterCollection class 406, and the Poster 408 each receive an ILogger object for recording information.

While the invention has been described with reference to the exemplary embodiments thereof, those skilled in the art will be able to make various modifications to the described embodiments of the invention without departing from the true spirit and scope of the invention.

What is claimed is:

1. A gateway, comprising:
a first communication path to accept a short message from a mobile device;
a translation module to insert said short message into an Hypertext Transfer Protocol (HTTP) message;
a second communication path to push said HTTP message to at least one Universal Resource Locator (URL); and
a return communication path to receive a return message relating to said HTTP message.

2. The gateway according to claim 1, wherein:
said HTTP message is a POST message.

3. The gateway according to claim 1, wherein:
said short message originated from a wireless device.

4. The gateway according to claim 1, wherein:
said short message is received via a Remote Method Invocation (RMI) callback mechanism.

5. The gateway according to claim 1, wherein:
said second communication path is adapted to transmit said HTTP message to a plurality of URLs.

6. The gateway according to claim 1, wherein:
said second communication path accepts return results from said URL;
said translation module inserts said return results into a short message; and
said first communication path transmits said short message to a short message service center servicing said mobile device.

7. The gateway according to claim 6, wherein:
said return results conform to HTTP.

8. The gateway according to claim 6, wherein:
said first communication path transmits a SUBMIT_SM message to said short message servicing center.

9. A method of communicating between a wireless device and an application program on an Internet Protocol server, comprising:
sending a short message from said wireless device to said Internet Protocol server;
routing said short message using a wireless protocol message; and
pushing said short message to said Internet Protocol server using a Hypertext Transfer Protocol (HTTP) message; and
returning data back to said wireless device from said Internet Protocol server through an HTTP stream established with said HTTP protocol POST message.

10. The method of communicating between a wireless device and an application program on an Internet Protocol server according to claim 9, wherein:
said wireless protocol is SMPP.

11. The method of communicating between a wireless device and an application program on an Internet Protocol server according to claim 9, wherein:
said wireless protocol is ReFlex.

12. The method of communicating between a wireless device and an application program of an Internet Protocol server according to claim 9, wherein:
said SMPP protocol message is a DELIVER_SM message.

13. The method of communicating between a wireless device and an application program of an Internet Protocol server according to claim 9, further comprising:
forwarding said routed short message to a gateway using an RMI callback mechanism.

14. The method of communicating between a wireless device and an application program of an Internet Protocol server according to claim 9, wherein:
said short message is sent to a predefined address.

15. The method of communicating between a wireless device and an application program of an Internet Protocol server according to claim 9, wherein:
said short message is conveyed to a plurality of Internet Protocol servers using respective HTTP POST messages.

16. The method of communicating between a wireless device and an application program of an Internet Protocol server according to claim 9, further comprising:
returning data back through an HTTP stream established with said HTTP POST message.

17. The method of communicating between a wireless device and an application program of an Internet Protocol server according to claim 16, further comprising:
routing said return data from said HTTP stream to a short message service center using an SMPP protocol message.

18. The method of communicating between a wireless device and an application program of an Internet Protocol server according to claim 17, wherein:
said SMPP protocol message is a SUBMIT_SM message.

19. The method of communicating between a wireless device and an application program of an Internet Protocol server according to claim 18, further comprising:
conveying said return data from said short message service center to a wireless device using an IS-41 protocol message.

20. Apparatus for communicating between a wireless device and an application program on an Internet Protocol server, comprising:
means for sending a short message from said wireless device to said Internet Protocol server;
means for routing said short message using an SMPP protocol message; and
means for pushing said short message to said Internet Protocol server using a Hypertext Transfer Protocol (HTTP) message; and
means for returning data back to said wireless device from said Internet Protocol server through an HTTP stream established with said HTTP protocol POST message.

21. The apparatus for communicating between a wireless device and an application program of an Internet Protocol server according to claim 20, wherein:
said SMPP protocol message is a DELIVER_SM message.

22. The apparatus for communicating between a wireless device and an application program of an Internet Protocol server according to claim 20, further comprising:
means for forwarding said routed short message to a gateway using an RMI callback mechanism.

23. The apparatus for communicating between a wireless device and an application program of an Internet Protocol server according to claim 20, wherein:
said means for sending sends said short message to a predefined address.

24. The apparatus for communicating between a wireless device and an application program of an Internet Protocol server according to claim 20, wherein:
said means for conveying conveys said short message to a plurality of Internet Protocol servers using respective HTTP POST messages.

25. The apparatus for communicating between a wireless device and an application program of an Internet Protocol server according to claim 20, further comprising:
means for returning data back through an HTTP stream established with said HTTP POST message.

26. The apparatus for communicating between a wireless device and an application program of an Internet Protocol server according to claim 25, further comprising:
means for routing said return data from said HTTP stream to a short message service center using an SMPP protocol message.

27. The apparatus for communicating between a wireless device and an application program of an Internet Protocol server according to claim 26, wherein:
said SMPP protocol message is a SUBMIT_SM message.

28. The apparatus for communicating between a wireless device and an application program of an Internet Protocol server according to claim 27, further comprising:
means for conveying said return data from said short message service center to a wireless device using an IS-41 protocol message.

* * * * *

UNITED STATES PATENT AND TRADEMARK OFFICE
CERTIFICATE OF CORRECTION

PATENT NO. : 7,355,990 B2  Page 1 of 1
APPLICATION NO. : 11/113033
DATED : April 8, 2008
INVENTOR(S) : Richard A. Smith and Johanna Wilson It is certified that error appears in the above-identified patent and that said Letters Patent is hereby corrected as shown below:

On the Title Page item (60) listing Related U.S. Application Data is not included. Please insert the following Related U.S. Application Data:

--(60) Related U.S. Application Data

Provisional Application No. 60/199,367, filed April 11, 2000, provisional Application No. 60/198,108, filed April 18, 2000; and U.S. Patent Application No. 09/588,460, filed on June 6, 2000.--

Signed and Sealed this

Fifteenth Day of July, 2008

JON W. DUDAS
*Director of the United States Patent and Trademark Office*

UNITED STATES PATENT AND TRADEMARK OFFICE
CERTIFICATE OF CORRECTION

PATENT NO. : 7,355,990 B2 Page 1 of 1
APPLICATION NO. : 11/113033
DATED : April 8, 2008
INVENTOR(S) : Richard A. Smith and Johanna Wilson It is certified that error appears in the above-identified patent and that said Letters Patent is hereby corrected as shown below:

On the Title page, insert Item [63] Related U.S. Application Data as follows:

-- (63) Continuation of Application No. 09/588,460, filed on June 6, 2000, now U.S. Patent No. 6,891,811. --

Signed and Sealed this

Sixth Day of July, 2010

David J. Kappos
*Director of the United States Patent and Trademark Office*

(12) INTER PARTES REEXAMINATION CERTIFICATE (709th)

United States Patent
Smith et al.

(10) Number: US 7,355,990 C1
(45) Certificate Issued: *Oct. 23, 2013

(54) MOBILE-ORIGINATED TO HTTP INTERNET COMMUNICATIONS

(75) Inventors: Richard A. Smith, Annapolis, MD (US); Johanna Wilson, Annapolis, MD (US)

(73) Assignee: TeleCommunication Systems, Inc., Annapolis, MD (US)

Reexamination Request:
No. 95/001,241, Oct. 2, 2009

Reexamination Certificate for:
Patent No.: 7,355,990
Issued: Apr. 8, 2008
Appl. No.: 11/113,033
Filed: Apr. 25, 2005

(*) Notice: This patent is subject to a terminal disclaimer.

Related U.S. Application Data

(63) Continuation of application No. 09/588,460, filed on Jun. 6, 2000, now Pat. No. 6,891,811.

(60) Provisional application No. 60/198,108, filed on Apr. 18, 2000.

(51) Int. Cl.
*H04B 7/00* (2006.01)

(52) U.S. Cl.
USPC .......................................... 370/310

(58) Field of Classification Search
None
See application file for complete search history.

(56) References Cited

To view the complete listing of prior art documents cited during the proceeding for Reexamination Control Number 95/001,241, please refer to the USPTO's public Patent Application Information Retrieval (PAIR) system under the Display References tab.

*Primary Examiner* — Christina Y Leung

(57) ABSTRACT

A mobile device-to-HTTP protocol gateway (MHG, or "MO Gateway") which translates between Wireless Mobile Originated commands from an SMSC, and an application server on the Internet (i.e., a "web IP Server"). A wireless Internet gateway establishes communications with one or more relevant SMSCs using standard format SMPP commands, and the MHG utilizes HTTP protocol POST messages to post short messages originated at the mobile device to a particular URL. Return results are received by the MHG via HTTP protocol messages, translated to SMPP messages, and forwarded back to the SMSC for delivery to the mobile device. The wireless Internet Gateway communicates with the MHG using RMI protocol commands. An MHG in accordance with the principles of the present invention enables a developer to create mobile applications using standard web development tools, e.g., Java Servlets. The MHG allows standard format command messages to be used throughout the pathway between a mobile device and an application program on a web IP server at a particular URL.

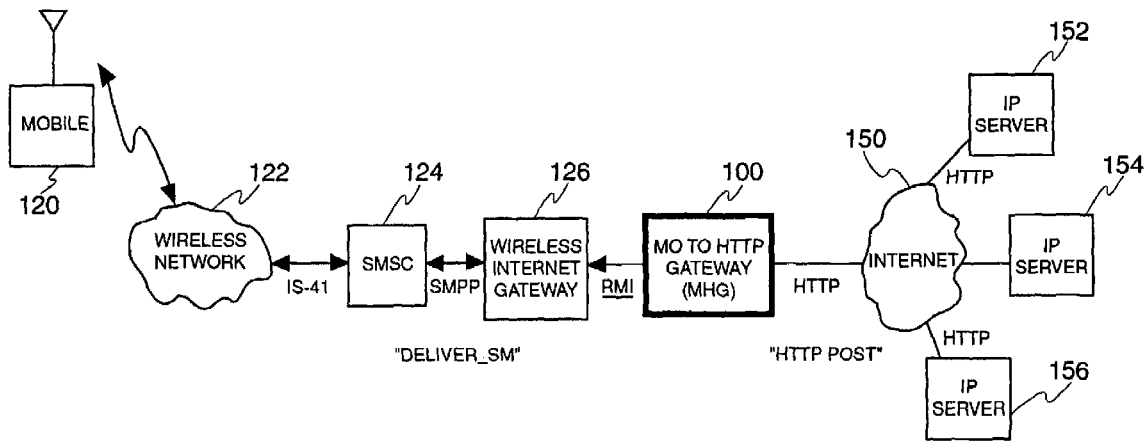

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 1, lines 4-11:

The present application [claims priority from U.S. Provisional patent application Ser. No. 60/198,108, entitled "Short Messaging Service Center SMPP to HTTP Internet Communications", filed on Apr. 18, 2000, and from U.S. patent application Ser. No.] *is a continuation of patent application Ser. No.* 09/588,460, [entitled "Short Messaging Service Center Mobile-Originated to HTTP Internet Communications," filed on Jun. 6, 2000,] now U.S. Pat. No. 6,891,811, [issued on May 10, 2005] *filed Jun. 6, 2000, which claims the benefit of provisional patent application Ser. No. 60/198,108, filed Apr. 18, 2000.*

AS A RESULT OF REEXAMINATION, IT HAS BEEN DETERMINED THAT:

The patentability of claims 1-8, 13 and 20-28 is confirmed.

Claims 9-12 and 14-19 are cancelled.

New claims 29-35 are added and determined to be patentable.

*29. The gateway according to claim 1, wherein a destination address formed at said mobile device accompanies said short message on said first communication path and enters said gateway on said first communication path.*

*30. The gateway according to claim 29, wherein said destination address and said short message exist in separate fields on said first communication path.*

*31. The gateway according to claim 29, wherein said destination address formed at said mobile device comprises a string of characters with fewer than seven characters.*

*32. The gateway according to claim 31, wherein said destination address formed at said mobile devices comprises a string of four characters.*

*33. The gateway according to claim 1, wherein said short message exists in a field on said first communication path.*

*34. The gateway according to claim 1, wherein said at least one URL specifies a servlet to handle said HTTP message.*

*35. The gateway according to claim 34, wherein said servlet utilizes a HTTP stream to return data to said mobile device.*

\* \* \* \* \*